Oct. 27, 1931.  A. McNAB  1,829,451
HYDRAULIC JACK OR SHOCK ABSORBER FOR VEHICLES
Filed June 15, 1928  7 Sheets-Sheet 2
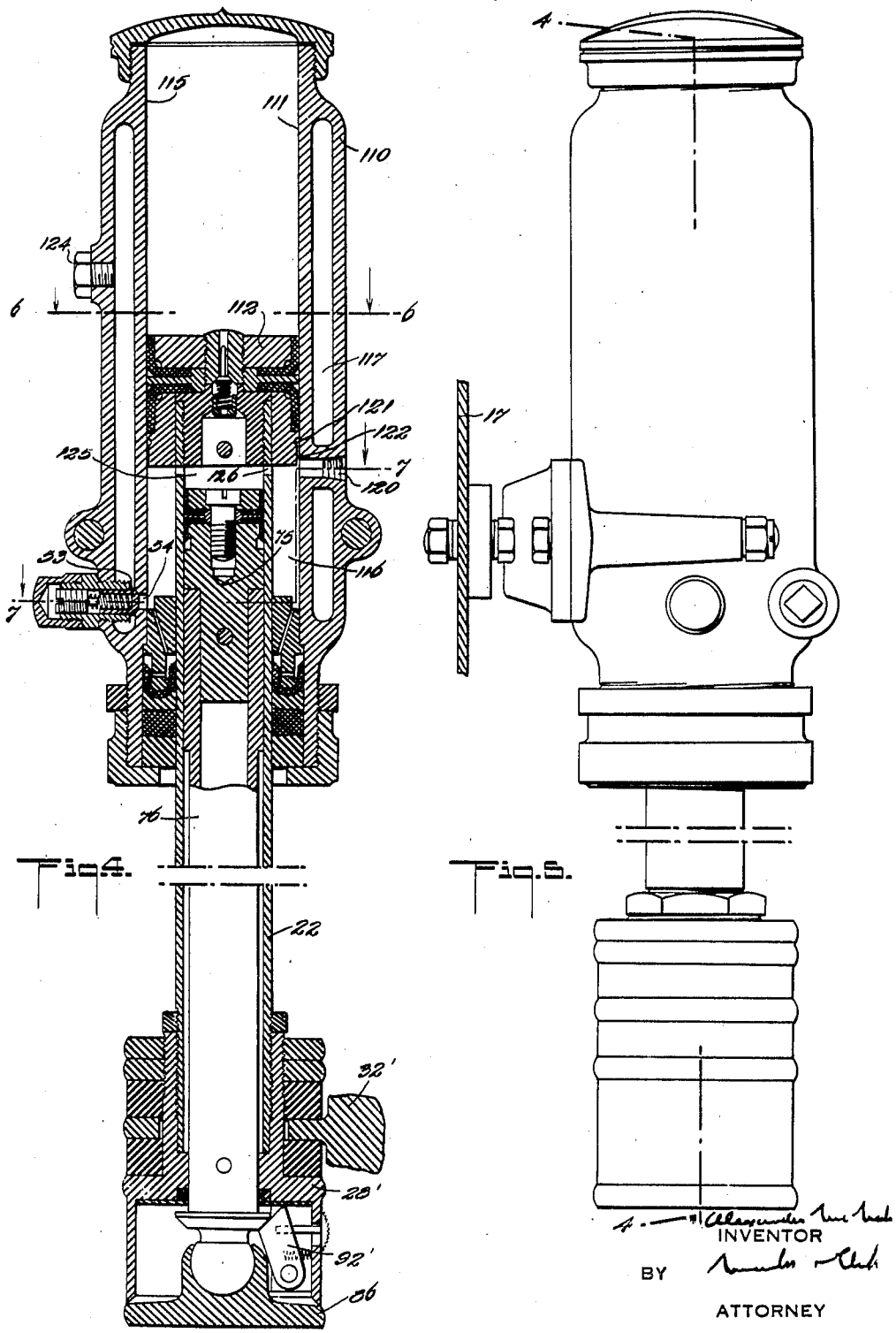

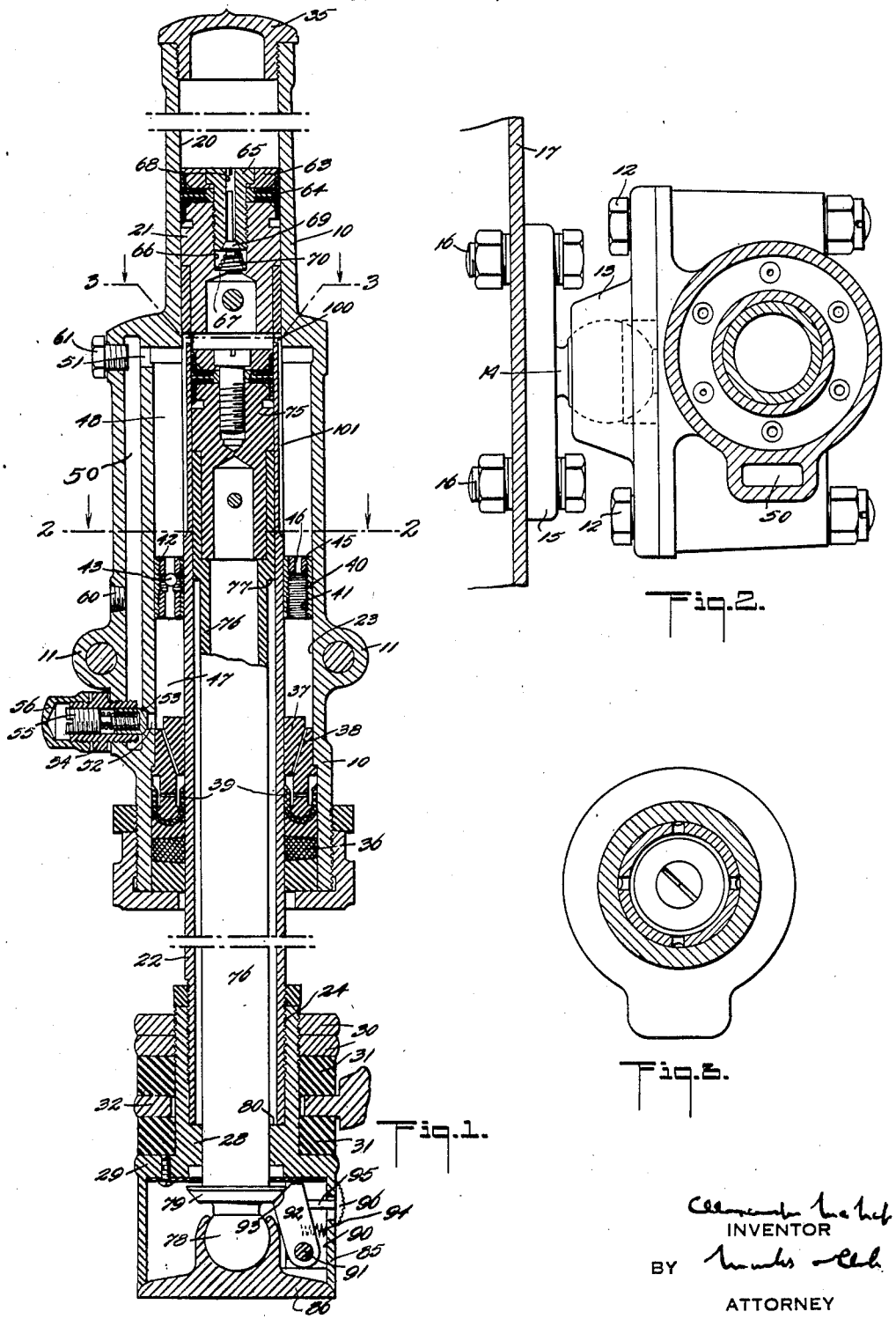

Oct. 27, 1931.　　　　A. McNAB　　　　1,829,451
HYDRAULIC JACK OR SHOCK ABSORBER FOR VEHICLES
Filed June 15, 1928　　　7 Sheets-Sheet 4
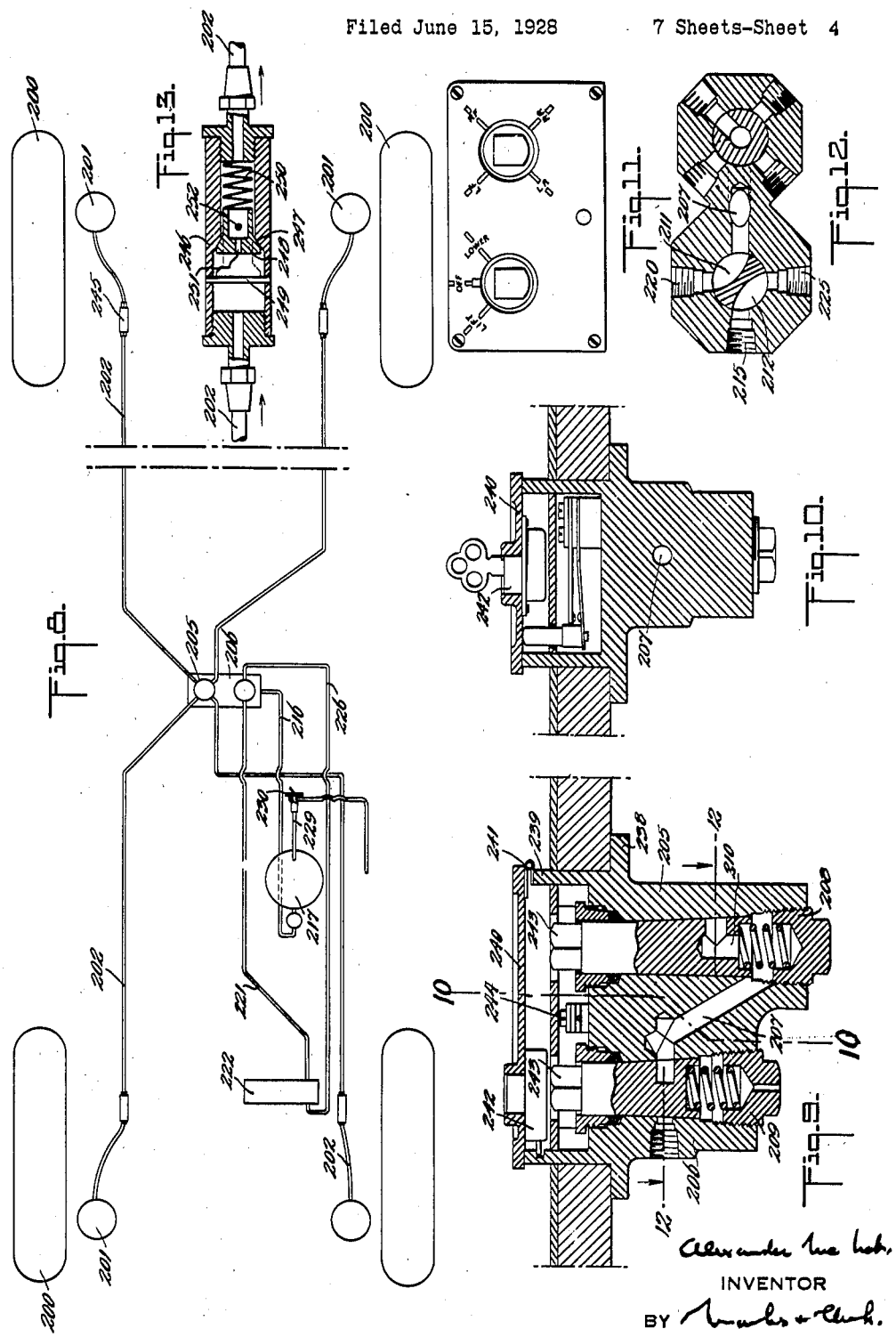

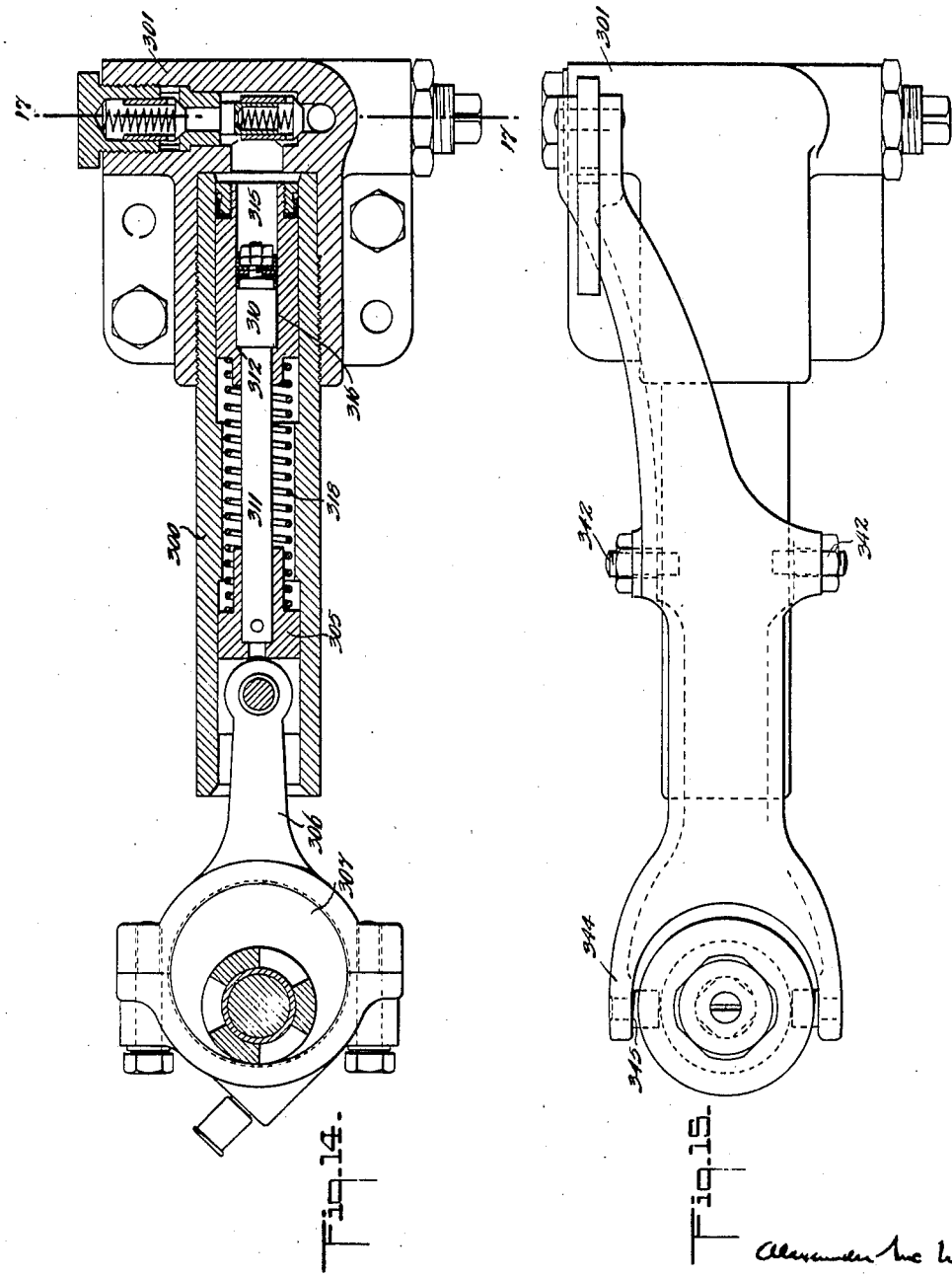

Oct. 27, 1931. A. McNAB 1,829,451
HYDRAULIC JACK OR SHOCK ABSORBER FOR VEHICLES
Filed June 15, 1928 7 Sheets-Sheet 6
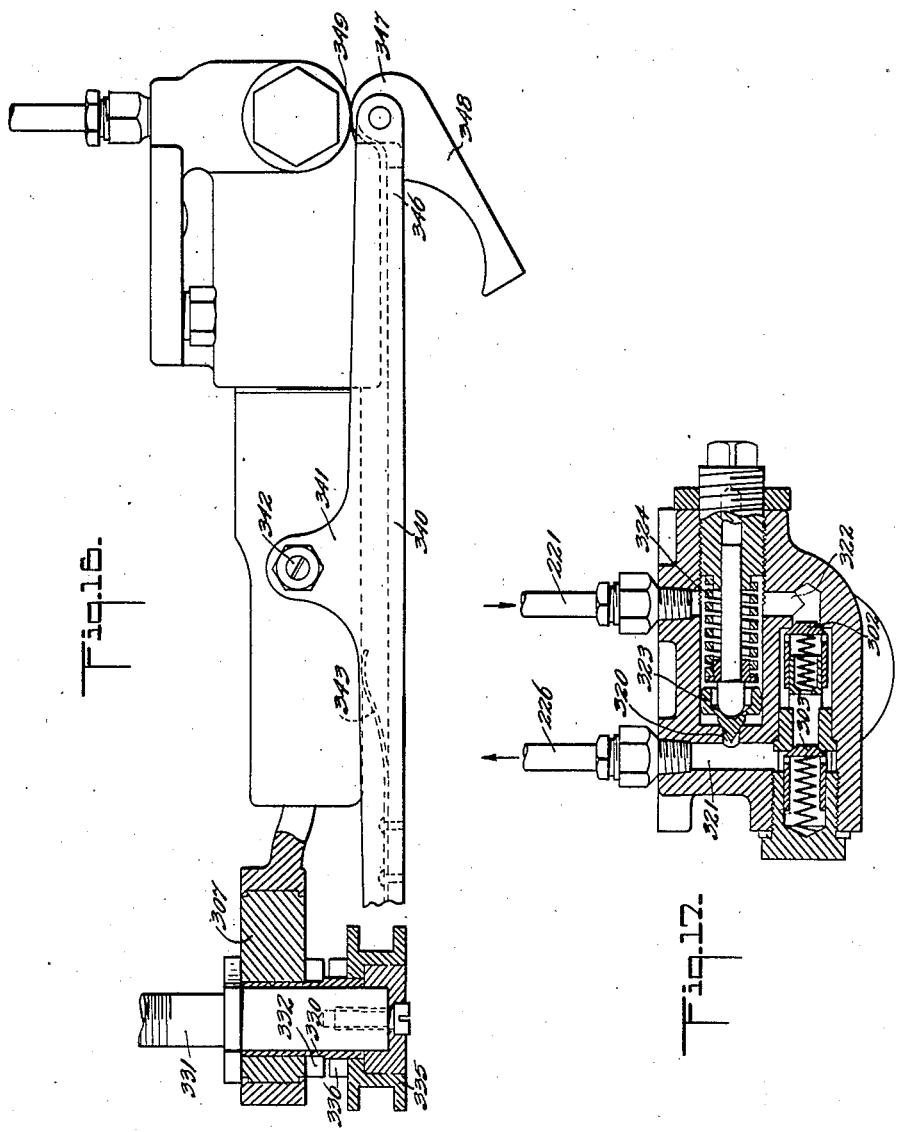

Oct. 27, 1931.  A. McNAB  1,829,451
HYDRAULIC JACK OR SHOCK ABSORBER FOR VEHICLES
Filed June 15, 1928  7 Sheets-Sheet 7
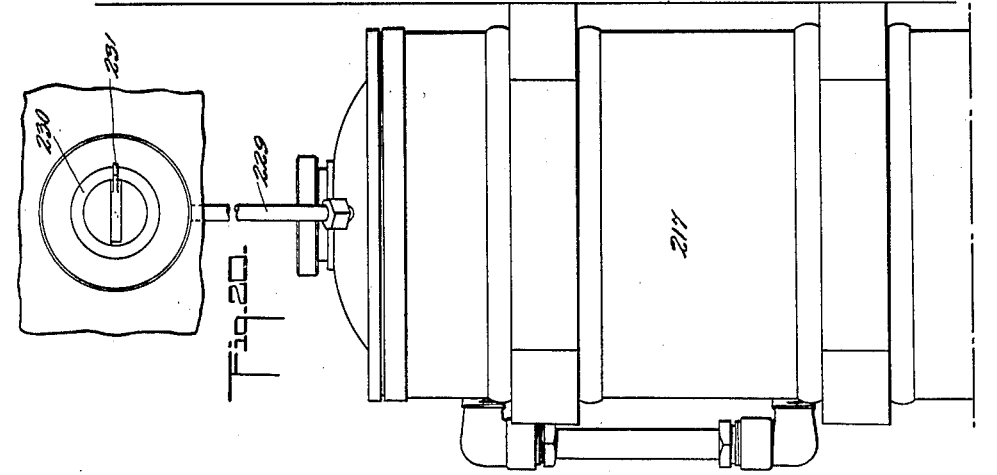
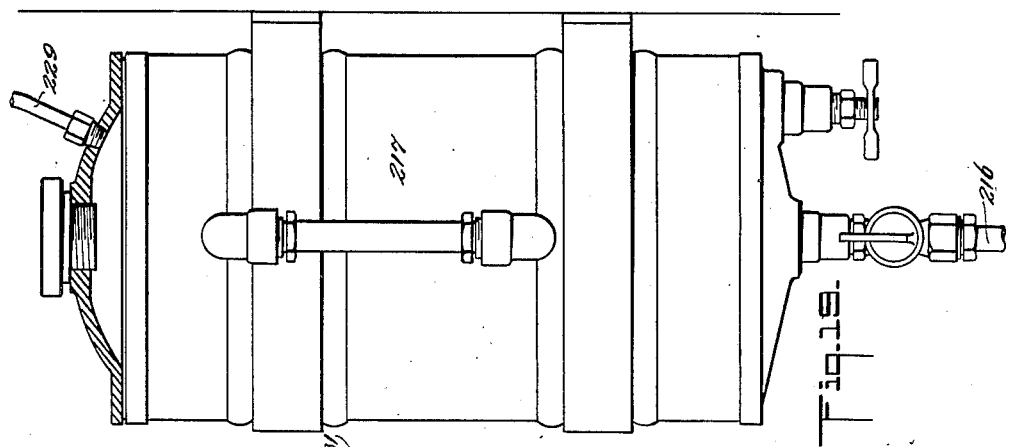
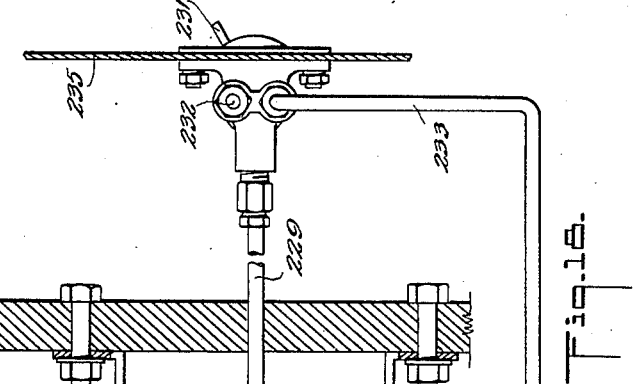
Alexander McNab
INVENTOR
BY *Marks + Clerk*
ATTORNEY Patented Oct. 27, 1931

1,829,451

UNITED STATES PATENT OFFICE

ALEXANDER McNAB, OF BRIDGEPORT, CONNECTICUT, ASSIGNOR TO McNAB ABSORBO-LIFT, INC., OF NEW YORK, N. Y., A CORPORATION OF NEW YORK

HYDRAULIC JACK OR SHOCK ABSORBER FOR VEHICLES

Application filed June 15, 1928. Serial No. 285,559.

This invention relates to a new or improved hydraulic shock absorbing and jacking system for road vehicles.

The primary object of this invention is to provide an improved shock absorber which will be more effective in absorbing road shocks than shock absorbers as now employed.

A further primary object is to provide an improved jacking system for permanent attachment to an autotmobile, which will be reliable, quick, and effective in operation, and will enable any one of the road wheels, or all four road wheels, to be raised from the ground with maximum facility.

A further primary object of the invention is to provide an improved combination shock absorbing and jacking system in a single apparatus which will avoid to as great a degree as is possible any unnecessary duplication of parts in accomplishing the two objects of shock absorption and jacking, thereby reducing both initial cost and the weight to be carried by the vehicle.

A further object is to provide such an apparatus in a neat and attractive form, which can be economically manufactured, and which will give effective service for a long period with little or no attention.

A particular object of the invention is to provide a hydraulic shock absorber with which is combined the cushioning properties of a pneumatic shock absorber, whereby in addition to the damping or control of the movement of the running gear of the vehicle that is obtained by virtue of controlled displacement of hydraulic fluid, a progressive damping or control of the movement of the running gear is obtained, so that with abnormal or great displacement an increased damping or retarding action is provided.

A further particular object is to provide such increased or progressive damping, as is obtained by pneumatic means, in a shock absorber in which provision is made for the release or by-passing of the hydraulic fluid upon the occurrence of excessive and abnormal shocks or displacement of the running gear.

A further particular object is to provide means for the return of any hydraulic fluid to the proper chamber in the event of its escaping past the piston means into the pneumatic chamber.

A further particular object is to provide a ready means for periodically recharging the shock absorber with hydraulic fluid, in order to make up for any loss in fluid that may take place through the escape of same or for any other cause.

A further particular object of the present invention is to provide a simple and effective jacking system that requires only a single pipe connection to be made with each of four jacks disposed adjacent the road wheels of the vehicle, and at the same time to effect both a positive extension of the jacking means and also a positive return of same.

A further object is to effect both the extension and return of said jacking means hydraulically through the operation of a single pump.

A still further object is to provide an effective means for automatically retaining the jacking means in withdrawn position out of contact with the road surface, when same is inoperative, and also for automatically releasing said retaining means when the jacking means is put into operation.

A still further object is to provide an improved and simplified method of controlling the jacking operation, whereby after the pump has been set in operation the jacking of the vehicle will be effected, and said vehicle will be maintained in raised position without further attention from the operator until it is desired to lower same.

A further object of the invention is to provide for controlling the raising and lowering of the vehicle solely by means of a valve or valves, whereby once the pump has been set in operation it is not necessary to declutch same or reverse same in order to effect the change over from the jacking of the vehicle to the lowering of same and the positive retraction of the jacking means.

A still further object of the present invention is to provide an improved alternative means of withdrawing the jacking means by suction so that at any time after the vehicle has been fully raised, the operation of the pump can be stopped, and the positive withdrawal of the jacking means can be effected by the starting up of the vehicle motor preparatory to the use of the vehicle for traveling purposes.

In the accompanying drawings which illustrate a preferred manner of carrying my invention into effect:

Fig. 1 is a sectional elevation of a preferred form of shock absorbing and jacking unit, Fig. 2 is a transverse section on line 2—2 of Fig. 1, Fig. 3 is a section on line 3—3 of Fig. 1, Fig. 4 is a sectional elevation of a modified construction of shock absorbing and jacking unit.

Fig. 5 is an external elevation of the unit shown in Fig. 4,

Figure 6:
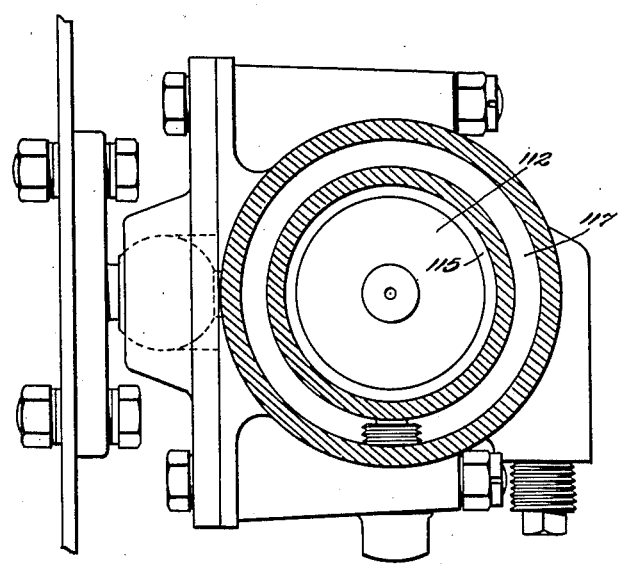
Fig. 6 is a section on line 6—6 of Fig. 4.

Fig. 8 is a diagrammatic plan view showing the lay-out of the various units of my improved system, and the piping connections thereto, Fig. 9 is a sectional elevation of a control valve and distributing valve, Fig. 10 is a section on line 10—10 of Fig. 9, Fig. 11 is a plan view of the control valve and distributing valve unit with the cover removed, Fig. 12 is a section on line 12—12 of Fig. 9, Fig. 13 is a sectional elevation of a check valve, Fig. 14 is a sectional elevation of the pump and clutch control, Fig. 15 is an external elevation thereof, Fig. 16 is a plan of the pump, Fig. 17 is a section on line 17—17 of Fig. 14, Fig. 18 is an elevation of a hydraulic fluid reservoir and vent or suction control valve associated therewith, Fig. 19 is a plan view of the parts shown in Fig. 18, Fig. 20 is a part sectional elevation showing piping connections to the reservoir.

*Shock absorbing and jacking unit, long form*

Referring to Figs. 1, 2 and 3, the shock absorber and jacking unit comprises a piston barrel member 10 which is provided with lugs 11 for receiving bolts 12 securing a socket member 13 thereto. The socket member 13 forms a seating for a ball 14 which is attached by a neck to a plate 15 provided with apertures for the reception of bolts 16 by which it is attached to the longitudinal chassis member 17 of the vehicle.

The piston barrel member 10 is formed at its upper end with a smaller cylindrical bore 20 within which there is provided a sliding piston element 21. Secured to the piston element 21 is a hollow piston extension 22 which extends through a larger cylindrical bore 23 formed at the lower end of the piston barrel member 10, and which has external screw threads 24 formed in its lower end.

A sleeve member 28 screwed on to the projecting end of the piston extension 22 is provided with an external shoulder 29 at one end and two screw threaded external locking rings 30 at its other end. Between the inner ring 30 and the shoulder 29 are disposed two rubber rings 31, and between the rubber rings is clamped an apertured part 32 of a bracket adapted for connection to the axle of the vehicle.

The upper end of the bore 20, or smaller cylinder in the piston barrel member 10 is open and provided with a screw cap 35 for maintaining said end normally hermetically sealed. The bore 23, or larger cylinder of the member 10 is provided with a stuffing box joint 36 engaging the exterior of the piston extension 22, said stuffing box joint being provided with a guide member 37 having passages 38 allowing the U-shaped elements 39 of the stuffing box joint to be subjected to the sealing pressure of hydraulic fluid within the cylinder 23.

Fixedly secured on the exterior of the piston extension 22 is a metallic ring 40 which forms a further piston element operative within the larger cylinder 23. Within this ring 40 there are provided a plurality of internally screw-threaded bores 41. In certain of these bores 41, there is inserted a screw-threaded valve seating 42 housing a ball valve 43 which prevents hydraulic fluid from passing upwardly from the lower side of the piston element 40 to the upper side thereof, but which permits relatively free passage of hydraulic fluid in the reverse direction. In the other of the bores 41, there are provided plugs 45 each having a small callibrated aperture 46 for permitting a relatively restricted flow of hydraulic fluid therethrough in either direction.

It is to be understood that the smaller cylinder 20 forms a main pneumatic chamber and contains a greater or lesser quantity of air, as found desirable. The larger cylinder 23 forms two hydraulic chambers containing oil, or other liquid, separated by the piston element 40. The lower hydraulic chamber 47 is hereinafter referred to as a main hydraulic chamber and the upper hydraulic chamber 48 is hereinafter referred to as an auxiliary hydraulic chamber.

The member 10 is formed at one side with a longitudinal passage 50 having an opening 51 communicating with the upper end of the auxiliary chamber 48, and having an opening 52 communicating with the lower end of the chamber 47. The opening 51 is unrestricted. The opening 52 constitutes a valve seating which is engaged by a spring pressed valve 53 housed within a valve casing 54 having an open end which projects externally of the member 10 and receives a screw plug 55 enabling pressure of the valve spring to be radily adjusted. A cap 56 which screws on to the valve casing serves to prevent the plug 55 from being unintentionally turned. It will be seen that the construction of the valve 53 is such that fluid can only flow in one direction, i. e., from the chamber 47 into the passage 50.

In a wall of the passage 50 there is provided an inlet opening 60 adapted for receiving a supply and withdrawal conduit for the cylinder 23. Near the upper end of the passage 50, the outer wall thereof is provided with a filler plug 61 to facilitate the initial charging of the shock absorber with hydraulic fluid.

It will be seen that the piston element 21 has a rigid connection with the tubular extension 22. This piston element has its upper portion formed by a disc 63 which serves to retain in position a pair of cup rings 64, the disc 63 being secured to the body of the piston element 21 by means of a screw plug 65 engaging a bore 66 in the piston element. Bore 66 is formed with an internal shoulder 67 at its lower end, and the plug 65 is formed with a small axial passage 68 having a conical valve seating at its lower end. A valve 69 cooperates with this seating and has a stem loosely fitting within the bore 68. Between the end of the valve 69 and the shoulder 67 there is provided a strong spring 70 which normally maintains the valve 69 closed on its seating.

Within the piston extension 22 there is provided a jacking plunger element 75 having rigidly attached thereto a plunger extension 76. The extension 76 is of a reduced diameter for the greater portion of its length, a shoulder 77 being formed at the junction of the full diameter portion and reduced diameter portion. The lower part of the plunger extension 76 extends through bearing surfaces formed in the member 28, and has a ball 78 formed at its lower end. Adjacent the ball 78 the plunger extension is provided with a shoulder 79 limiting its upward or retractive movement in the piston extension 22. The shoulder 77 serves to limit the downward movement or advancing movement of the plunger extension by cooperating with a shoulder 80 formed adjacent the bearing in the member 28.

The member 28 is formed at its lower end with a projecting cylindrical housing 85 which surrounds a foot member 86 when the plunger extension is retracted, the foot member 86 being provided with a part-spherical socket which is sprung on to the ball 78. Catch means for normally retainig the plunger or plunger extension in retracted position comprises a pair of lugs 90 formed on the part 85, which lugs carry a pivot pin 91 on which an arm 92 is fulcrumed. Arm 92 has an inclined face 93 which engages an inclined face formed on the under side of the shoulder 79. A compression spring 94 housed partly in a recess in the arm 92 serves to press the said arm 92 into engagement with the shoulder 79, the end of the spring 94 abutting against the interior of part 85. The arm 92 has a lateral extension 95 which projects through an opening in the part 85 and is formed with a milled head 96, the arrangement being such that a downward pressure on the head 96 will serve, if necessary, to disengage the arm 92 from the shoulder 79.

The interior of the piston extension 22, which forms the plunger cylinder, is at all times maintained in communication with the auxiliary hydraulic chamber 48 by means of a series of ports 100 formed in said extension 22 immediately below the piston element 21. When the piston element and piston extension are in an upper position, the ports 100 are covered by the lower portion of the cylinder 20. The exterior surface of the extension 22 is accordingly provided with a series of longitudinal grooves 101, each communicating with one of the ports 100, and extending downwardly to maintain said ports open to the auxiliary hydraulic chamber 48.

In operation, assuming the auxiliary hydraulic chamber 48, the main hydraulic chamber 47, and the passage 50 are filled with liquid, it will be seen that any longitudinal movement of the piston extension 22 relative to the piston barrel member 10, as will be caused by any diplacement of the running gear of the vehicle, will necessarily cause a transference of fluid from one of said chambers 47 and 48 to the other of said chambers. Any upward movement of the piston extension 22 as will be caused by road shocks, will be relatively unimpeded, as the ball valves 43 in the piston element 40 will permit a relatively free transference of fluid from the auxiliary chamber 48 to the main chamber 47. Any downward movement of the piston extension 22, as will be caused by the rebound action of the springs of the vehicle following an upward displacement, will be, however, substantially checked by the hydraulic action of the shock absorber, as the ball valves 43 will prevent flow of fluid through the large passages in the piston element 40, and the calibrated openings 46 will only permit of a relatively small flow of fluid. The valve 53 is maintained closed by its spring during the normal action of the shock absorber, this valve being only operative upon the occurrence of abnormal pressure in the main chamber 47 such as will occur when unusually excessive displacement of the suspension springs of the vehicle has taken place. When, however, such abnormal pressure is developed, fluid in addition to passing from the chamber 47 through the openings 46 to the chamber 48 will pass to said chamber 48 by way of the passage 50.

In addition to the controlling action of the hydraulic fluid upon the piston element 40, the movement of the piston extension 22 is restrained or controlled by the action of pneumatic fluid in the pneumatic chamber 20 upon piston element 21. It will be seen that the action of the pneumatic fluid is proportional to the displacement of the piston element 21, and consequently has a relatively small influence for small displacements of the running gear, but has a progressively increasing shock absorbing influence for large displacements. It will be appreciated that this action is not influenced by the speed at which the piston extension 22 and the piston element 21 moves, as in the case of the action of the hydraulic fluid upon the piston element 40. The extent to which the pneumatic chamber 20 operates to restrain movement of the piston extension 22 can be readily adjusted when the shock absorber is installed on the vehicle, by removing the cap 35, and allowing atmospheric air to enter the chamber 20 when the piston element 21 is in varying positions therein. If desired, the quantity of air within the chamber may be very small, the cap 35 being removed and then replaced when the piston element 21 is in an extreme upper position, so as to produce a suction effect upon the piston element 21, which will tend to draw the piston extension upwardly, and will increase the retarding action on the advancing or downward movement of the piston extension. This action of the pneumatic cylinder will, however, in all cases have the characteristics above pointed out namely, progressively increased action with increased displacements of the running gear of the vehicle, said action being unaffected by the rate at which said displacement takes place.

In order to prevent any damage to the apparatus occurring through escape of hydraulic fluid past the piston element 21 into the chamber 20, the valve 69 is provided, so that should the piston element move up against a solid body of hydraulic fluid in the bore 20, the valve 69 will be opened. Apart from this condition, however, the valve 69 remains closed by the pressure of spring 70 and the pressure of hydraulic fluid below it.

During the normal running of the vehicle, the jacking mechanism is inoperative. The jacking plunger 75 is normally prevented from relative movement to the piston extension 22 by means of the catch arm 92. In this connection it will be seen that the shock absorbing action of the parts does not generate any relatively high pressure in the auxiliary chamber 48 such as to overcome the retaining action of the catch 92. When, however, it is desired to operate the jack, hydraulic fluid is forced into the member 10 through the opening 60, by means hereinafter described. This fluid passes through the passage 50, port 51, chamber 48, ports 100 into the plunger cylinder. The downward force acting on the plunger 75 and plunger extension 76 displaces the catch arm 92 by reason of the inclined shoulder thereon and advances said extension 76 or jack, until the foot member 86 engages the ground and the vehicle is raised by reason of the connection with the axle bracket 32. The fluid forced into the unit does not have any appreciable action on the piston element 40, as pressure in the chambers 47 and 48 is equalized by the opening of the ball valves 43. The fluid has, however, an action upon the under side of the piston element 21 tending to move the piston extension 22 upwardly. This latter action is of advantage as, in conjunction with the chassis connection with the plate 15, it counteracts the rebounding action of the suspension springs of the vehicle when the weight is taken off the road wheels, and thus minimizes the height to which the chassis has to be elevated in order to clear the road wheel of the road surface.

When it is desired to lower the vehicle, fluid is sucked out of the opening 60 by means hereinafter described, and the suction upon the plunger element 75 effects a positive retraction of said plunger together with its extension 76 and the foot member 86, until the shoulder 79 moves past the catch arm 92, and said catch arm is moved by its spring 94 into the position retaining said jacking parts in their retracted or upper position.

The above description relates to a form of shock absorbing and jacking unit which is a preferred form and is termed the long form.

*Shock absorbing and jacking unit, short form*

In Figs. 4, 5, 6 and 7, I have illustrated an alternative form of shock absorbing and jacking unit, which has a somewhat different action from the above form, and has the advantage that it is of shorter length for the same range of movement between the vehicle axle and the chassis. This modified form is termed the short form.

The short form of unit is provided with piston barrel member 110 having a single piston cylinder 111 within which operates a single piston element 112. This piston element 112 is provided with a piston extension 22 similar to that of the long form, and having a member 28, bracket 32 for connection with the vehicle axle, foot member 86, and catch arm 92, all similar to that described with reference to the long form. The piston barrel member 110 is provided with a ball connection with the chassis 17 of the vehicle as above described.

The piston element 112 operates in the cylinder 111 to form two main chambers, an upper pneumatic chamber 115 similar in action to the chamber 20 of the long form, and a lower main hydraulic chamber 116 corresponding to the chamber 47 of the long form. An auxiliary hydraulic chamber 117 corresponding to the chamber 48 of the long form, is formed as an annular chamber in the member 110. This auxiliary chamber 117 communicates with the main hydraulic chamber 116 near its lower end by means of a port 54 having a valve 53 similar to the valve 53 of the long form.

Figure 7:
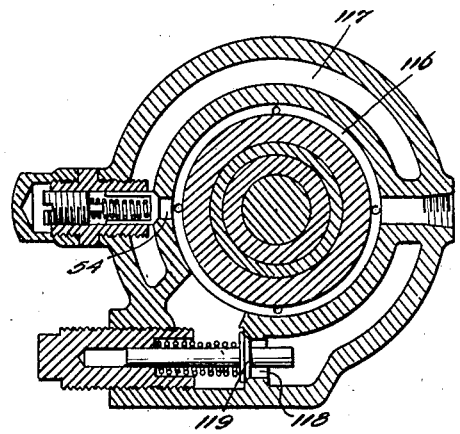
Fig. 7 is a section on line 7—7 of Fig. 4.

The port 54 forms an outlet port from the chamber 116. An inlet port to said chamber, as shown in Fig. 7, is formed by an opening 118 which is normally closed by a one-way valve 119 urged into engagement with a seat in the port 118 by means of a light spring as illustrated.

An inlet port 120 formed in the member 110 extends through into the upper portion of the chamber 116, and in order to insure that this opening will not be covered by the piston element 112 the lower portion of said element is provided with an annular groove 121 and with longitudinal grooves 122.

The outer wall of the auxiliary hydraulic chamber 117 is provided with a filler plug 124 located at the normal level of hydraulic fluid therein. Above this level the chamber 117 contains a trapped volume of pneumatic fluid.

Within the piston extension 22 there is provided a jacking plunger 75 and plunger extension 76 corresponding to members 75, 76 of the long form. The interior of member 22, or plunger cylinder, is maintained in communication with the main hydraulic chamber 116 by ports 126.

In operation, the pneumatic fluid within the chamber 115 acts upon the piston element 112 as in the case of the long form. The hydraulic fluid in the chamber 116 has, however, a somewhat different action upon the piston element. As the piston element moves upwardly upon the occurrence of a road shock, hydraulic fluid flows into the main chamber 116 with relatively little hindrance by way of the inlet port 118, the trapped pneumatic fluid in the auxiliary chamber 117 permitting the hydraulic fluid to be withdrawn therefrom. When the piston element 112 moves downwardly as the result of the rebound action of the vehicle suspension system, the hydraulic fluid in the chamber 116 is forced into the auxiliary chamber 117 by way of the outlet port 53, and the trapped pneumatic fluid in the chamber 117 is compressed. Thus in this form the valve 54 does not act only in the case of excessive pressures, but takes the place of the calibrated orifices 46 of the long form, and in addition to the retarding of the downward movement of the piston element by reason of the resistance to the outward flow of fluid which the relatively strong spring operating on the valve 53 imposes, an additional retarding influence is obtained by reason of the pneumatic fluid in the auxiliary chamber 117.

The operation of the jacking plunger and jacking parts associated therewith in this form of the unit is identical to that of the long form.

In Fig. 8, a general layout of the apparatus is illustrated in diagrammatic form, the road wheels of the vehicle being designated 200, the shock absorbing and the jacking units being designated 201. Each of these units 201 is connected by a single conduit 202 to a distributing valve casing 205. The conduits 202 are hereinafter referred to as cylinder conduits. The distributing valve casing 205 is illustrated in detail in Fig. 9, and is shown formed in one with a control valve casing 206, a conduit or passage 207 being provided to connect the two valve casings through a distributing valve 208 and a control valve 209. The passage 207 is at all times in communication with an axial passage 210 in the valve 208, while said passage 207 is at times in communication with either the passage 211 or passage 212 in the valve 209.

The axial passage 210 in the distributing valve 208 is provided with a lateral branch which is adapted to register with any one of the cylinder conduits 202, as desired. The control valve casing 206 has four ports of which the passage 207 constitutes one. Another of said ports comprises a port 215 which connects with a reservoir conduit 216 leading to a hydraulic fluid reservoir 217. The third port 220 connects with a pump conduit 221 leading to the suction intake of a pump 222. The fourth port 225 connects with a conduit 226 leading to the outlet port of the pump 222. A conduit 229 hereinafter referred to as a suction conduit connects the upper end of the reservoir 217 with a valve device 230 which is illustrated in detail in Figs. 18 and 20. The valve device 230 comprises a two-way valve having an operating lever 231 which serves to place the suction conduit 229 either in communication with a vent opening 232 or in communication with a pipe 233 leading to the intake manifold of the automobile engine.

The valve 230 is adapted to be mounted on the instrument board 235 of the vehicle. The valve casings 205 and 206 are adapted to be mounted centrally of the floor of the vehicle, and for this purpose valve casings are provided with a flange 238 adapted to engage the under side of the floor and an upstanding housing portion 239 which projects through the floor and carries a cover 240 provided with a hinge mounting 241 at one end and a lock 242 at the other end. Beneath the cover 240 the housing 239 is provided with a plate 244 having apertures enabling access to be obtained to the squared upper portions 243 of the valve members 208 and 209, the plate being provided with markings on its surface as illustrated in Fig. 11 for enabling the position of the valve members to be readily indicated by reference to a pointer provided on a key which is furnished for operating these valve members.

Each of the filler conduits 202 is provided with a check valve 245 which is illustrated in detail in Fig. 13. This check valve comprises valve casing 246 having connections at each end for the conduit 202 and an internal shoulder 247 forming the valve seat. A valve member 248 for cooperating with said seat is normally maintained in open position against a stop pin 249 by means of a light spring 250.

The valve 248 is provided with a small aperture 251 through its face, and a series of further apertures 252 extending laterally through its stem portion.

The operation of the valve control mechanism is as follows:—

When it is desired to jack up the road wheels of the vehicle, the pump is set in operation by means hereinafter described. The cover 240 is opened, and a key is inserted on to the end of the valve member 209, and said member is turned to the "lift" position. This places the outlet of the pump in communication with the passage 207 leading to the distributing valve member 208, and at the same time places the reservoir conduit 216 in communication with the inlet port of the pump. The key is then placed on the end of the distributing valve member 208, and said member is turned to place any one of the cylinder conduits 202 in communication with the passage 207, or all of said conduits 202 successively in communication with said passages, whereupon the jacking units 201 are operated in the manner above described.

When it is desired to lower the vehicle, and withdraw the jacks to retracted position, the control valve 209 is rotated through half a turn to the "lower" position. This connects the inlet port of the pump, by way of the conduit 221, with the passage 207 and at the same time connecting the outlet conduit of the pump by way of the passage 226 with the reservoir, whereupon the hydraulic fluid is withdrawn from the jacking unit 201, or each of the four jacking units successively by successively rotating the distributing valve 208 through a quarter turn, and the road wheels of the vehicle are lowered in the manner above described.

If desired, after the jacking up has been effected, the operation of the pump may be stopped, and the jacks may thereafter be retracted to their normal position by utilizing the suction in the intake manifold of the automobile engine to withdraw the hydraulic fluid from the jacks, this method of retracting the jacks constituting an alternative method to that afforded by the pump. To effect this alternative retraction of the jacks, it is merely necessary to have the engine of the vehicle running, and to move the control lever 231 of the valve 230 to connect the suction pipe 229 with the manifold pipe 232, and to turn the control valve 209 to the "lower" position as mentioned above. It will be appreciated that this alternative method of retracting the jacks will be a great convenience in a case where it is desired to move the vehicle after it has been lowered, as then it will not be necessary to keep the pump running, or again set same in operation, and the engine which will require to be used for driving the vehicle can also be used for retracting the jacks.

The operation of the check valves 245 is to prevent a too sudden lowering of the vehicle when the control valve 209 is turned to the "lower" position. Normally, the valve member 248 remains open and a moderate flow of fluid is permitted past the sides of the valve and valve seating and through the ports 252. When, however, the fluid is suddenly released by the turning of the valve 209, the sudden flow of fluid towards the right-hand of Fig. 13 causes the valve 248 to shut, and thereupon only a relatively small flow of fluid can take place through the port 251.

It will be appreciated that each time the units 201 are operated to effect a jacking of the vehicle, the said units will be completely charged with hydraulic fluid from the reservoir 217, and when the jacks are retracted the excess hydraulic fluid will be withdrawn so as to leave the fluid level in said units 201 at the level of the port 51 or the level of the inlet opening 120, and thus any loss of hydraulic fluid which takes place during the shock absorbing functions of the units will be made up. This feature of providing for the recharging of the shock absorbing units from the reservoir by means of a pump constitutes an important feature of my invention as it materially reduces the servicing necessary to maintain the shock absorbers in effective operative condition over long periods of use.

*Pump and clutch control*

From the foregoing it will be appreciated that I prefer to employ a single pump for effecting both a high compression of the hydraulic fluid sufficient to lift the vehicle, and also for effecting a high degree of vacuum sufficient to retract the jack plungers and extension past the catch members 92. The feature of utilizing suction for retracting the jacks is an important one as it renders the provision of only a single conduit to each jacking unit necessary, and it will be appreciated that as portions of such conduits require to be of a flexible nature in view of the ball mounting of the jacking units, such conduits require special connections and careful installing in order to prevent loss of fluid therefrom.

The pump I prefer to employ as illustrated in Figs. 14 to 17, comprises a pump cylinder 300 having a cylinder head 301 in which is provided a one-way spring pressed inlet valve 302 communicating with the conduit 221, and a one-way spring pressed outlet valve 303 communicating with the conduit 226. Within the end of the cylinder 300 there is provided a cross head 305 connected by a strap 306 to an eccentric 307 for reciprocating same. The cross head 305 is directly connected to a small piston 310 by means of piston rod 311, a shoulder 312 being formed at the junction of members 310 and 311. The small piston 310 operates within a cylinder 315 formed within a larger piston 316. Piston 316 operates within the cylinder 300. The end of the cylinder 315 is of reduced diameter to form a shoulder for cooperating with the shoulder 312, and a spring 318 which is interposed between the end of the piston 316 and the cross head 305 tends to maintain the larger piston 316 in engagement with said shoulder.

In operation, when the cross head is reciprocated and the pump is operating as a suction pump the large piston 316 is withdrawn with the small piston 310 to effect a suction stroke, and as the piston 310 effects its return stroke, the spring 318 also effects a return stroke of the large piston 316. Thus the two pistons move as a single unit, and the pump operates with a relatively large piston area. When the pump is operating as a compression pump, the operation is at first similar to the suction operation, and the pump delivers a relatively large volume of fluid until the pressure of fluid increases sufficiently to prevent the spring 318 from causing the large piston 316 to effect a compression stroke. When this occurs, the small piston 310 reciprocates within the large piston 315 and the pump operates with a relatively small piston area to deliver fluid under high pressure.

The cylinder head 301 is provided with a by-pass opening 320 which connects the outlet passage 321 with the inlet passage 322. This opening 320 is normally maintained closed by a one-way valve 323 urged by means of a strong spring 324, on to a valve seat formed in the opening 320. When, however, the pressure in the system becomes excessive, such as when the jacks are advanced to their full extension, or for any other reason, the valve 323 opens and allows by-passing of the fluid. Thus it will be seen that it is not necessary for any special provision to be made for stopping the operation of the pump directly when the jacks have been fully extended, and the pump can be stopped at any time desired or kept running until the jacks have been subsequently retracted.

The control for effecting operation of the pump and disconnection of same from a source of power, preferably the cam shaft of the automobile engine, comprises the provision of a bushing 330 keyed to an extension 331 of the engine cam shaft, on this bushing the eccentric 307 is freely mounted. Laterally extending from the eccentric 307, and concentric with the bushing are a series of dogs 332. A flanged collar 335 keyed to the extension 331 is provided with laterally extending dogs 336.

A lever 340 has flange like lugs 341 which are pivotally mounted on the cylinder 300 by means of pins 342, and a leaf spring 343 tends to maintain a forked end 344 of the lever away from the eccentric 307. The forked end 344 carries rollers 345 which engage between the flanges of the collar 335. The other end 346 of the lever is provided with a pivotally mounted control cam 347 having an operating arm 348 formed thereon, the cam being pressed into engagement with a face 349 on the cylinder head by means of the spring 343. From the foregoing it will be seen that movement of the operating arm 348 will cause the dogs 336 to be engaged with or freed from the dogs 332, thus setting the pump in operation or rendering same idle as desired.

It is, however, to be understood that it is within the scope of my invention to provide separate pumps for effecting compression of the fluid and suction withdrawal, and to make any other modifications within the spirit of the invention as set out in the appended claims.

I claim:—

1. A vehicle shock absorber comprising a piston barrel adapted for connection with one part of the vehicle, said piston barrel having one portion thereof formed with a cylinder of relatively small diameter; said piston barrel having another portion thereof formed with a cylinder of larger diameter; a smaller piston element operative within said smaller cylinder; an extension on said piston element extending through said larger cylinder and adapted for connection with another part of the vehicle; a further piston element mounted on said piston extension and operative within said larger cylinder; said smaller cylinder and smaller piston element therein forming a closed pneumatic chamber; said larger cylinder forming an auxiliary hydraulic chamber between said larger piston element and the end of said smaller cylinder; said larger cylinder forming a main hydraulic chamber between said larger piston element and the end of said larger cylinder remote from said smaller cylinder; and means permitting a controlled flow of fluid from said auxiliary hydraulic chamber to said main hydraulic chamber and from said main hydraulic chamber to said auxiliary hydraulic chamber.

2. A vehicle shock absorber comprising a piston barrel adapted for connection with one part of the vehicle; said piston barrel having one portion thereof formed with a cylinder of relatively small diameter; said piston barrel having another portion thereof formed with a cylinder of larger diameter; a piston element operative within said smaller cylinder; an extension on said piston element extending through said larger cylinder and adapted for connection with another part of the vehicle; a further piston element mounted on said piston extension and operative within the larger cylinder; said smaller cylinder and smaller piston element therein forming a closed pneumatic chamber; said larger cylinder forming an auxiliary hydraulic chamber between said larger piston element and the end of said smaller cylinder; said larger cylinder forming a main hydraulic chamber between said larger piston element and the end of said larger cylinder remote from said smaller cylinder; a passage connecting said main hydraulic chamber with said auxiliary hydraulic chamber; a one way valve in said passage permitting relatively unrestricted flow of fluid from said auxiliary hydraulic chamber to said main hydraulic chamber; and means permitting a restricted flow of fluid from said main hydraulic chamber to said auxiliary hydraulic chamber.

3. A vehicle shock absorber system comprising a piston barrel adapted for connection with one part of the vehicle; piston means operative within said barrel; an extension on said piston means and adapted for connection with another part of the vehicle; said piston means having at least two operative piston faces within said barrel; a pneumatic chamber in said barrel bounded at one end by one of said piston faces, a main hydraulic chamber in said barrel bounded at one end by another of said piston faces; an auxiliary hydraulic chamber associated with said barrel; and transferring means permitting the transference of hydraulic fluid to and from said main hydraulic chamber and auxiliary hydraulic chamber; said transferring means including a valved passage permitting relatively unobstructed flow of hydraulic fluid in one direction; said transferring means including a passage having obstructing means permitting relatively restricted flow of hydraulic fluid in the opposite direction, an inlet opening in said piston barrel communicating with one of the hydraulic chambers associated therewith; a reservoir for hydraulic fluid carried by the vehicle; a supply conduit connecting with said inlet opening with said reservoir; a pump associated with said reservoir and supply conduit and operative to transfer hydraulic fluid from said reservoir to said piston barrel and valve means operable for preventing fluid from discharging from the piston barrel through said conduit.

4. A vehicle shock absorber comprising a piston barrel for connection with one part of the vehicle; shock absorbing piston means for connection with another part of the vehicle; hydraulic means for retarding displacement of the piston means to a substantial extent in one direction and permitting relatively free displacement in the other direction; and pneumatic means for resisting the displacement of the piston means in said other direction with the resistance increasing progressively with increase in said displacement; said hydraulic means comprising a main hydraulic chamber formed by said piston barrel and one face of said piston means, and a valved transfer passage communicating said chamber with an auxiliary chamber; said transfer passage being free from obstruction by said piston means throughout the operative range of movement of said piston means.

5. A vehicle shock absorber comprising a piston barrel for connection with one part of the vehicle; shock absorbing piston means for connection with another part of the vehicle; hydraulic means for retarding displacement of the piston means to a substantial extent in one direction and permitting relatively free displacement in the other direction; and pneumatic means for resisting the displacement of the piston means in said other direction with the resistance increasing progressively with increase in said displacement, said pneumatic means comprising a closed pneumatic chamber bounded by one end of said piston barrel and an operative face of said piston means; said piston face having a discharge passage therethrough for connecting said pneumatic chamber with said hydraulic means; a one-way valve in said discharge passage; and a spring for maintaining said one-way valve closed during normal operation of the shock absorber.

6. A combination shock absorber and jack for vehicles; said device comprising a piston barrel for connection with one part of the vehicle; a tubular piston rod projecting from the lower end of said piston barrel adapted for connection with another part of the vehicle; a pneumatic chamber located in the upper end of said piston barrel and closed by a shock absorber piston carried on the upper end of said piston rod; a hydraulic chamber in said piston barrel below said shock absorber piston and closed by a piston surface associated with said shock absorber piston rod; means permitting transference of fluid to and from said hydraulic chamber; said hydraulic chamber being external to said piston rod; said piston rod forming a jack plunger cylinder; a jack plunger within said cylinder; apertures in said piston rod communicating the upper end of said cylinder with said hydraulic chamber; means for normally preventing extension of said jack plunger relative to said cylinder; and a valved supply system communicating with said hydraulic chamber for delivering and withdrawing hydraulic fluid to and from said cylinder.

7. A combination shock absorber and jack for vehicles; said device comprising a piston barrel for connection with one part of the vehicle; a tubular piston rod projecting from the lower end of said piston barrel adapted for connection with another part of the vehicle; a pneumatic chamber located in the upper end of said piston barrel and closed by a shock absorber piston carried on the upper end of said piston rod; a hydraulic chamber in said piston barrel below said shock absorber piston and closed by a piston surface associated with said shock absorber piston rod; means permitting transference of fluid to and from said hydraulic chamber; said hydraulic chamber being external to said piston rod; said piston rod forming a jack plunger cylinder; a jack plunger within said cylinder; apertures in said piston rod communicating the upper end of said cylinder with said hydraulic chamber; means for normally preventing extension of said jack plunger relative to said cylinder; a valved supply system communicating with said hydraulic chamber for delivering and withdrawing hydraulic fluid to and from said cylinder; a one-way valve in said shock absorber piston communicating said pneumatic chamber with the interior of the piston rod; and a spring for normally maintaining said one-way valve closed.

In testimony whereof I affix my signature.

ALEXANDER McNAB.